No. 754,249. PATENTED MAR. 8, 1904.
L. T. SNOW & A. A. WARNER.
FOOD CHOPPER.
APPLICATION FILED JUNE 30, 1902.
NO MODEL. 2 SHEETS—SHEET 1.
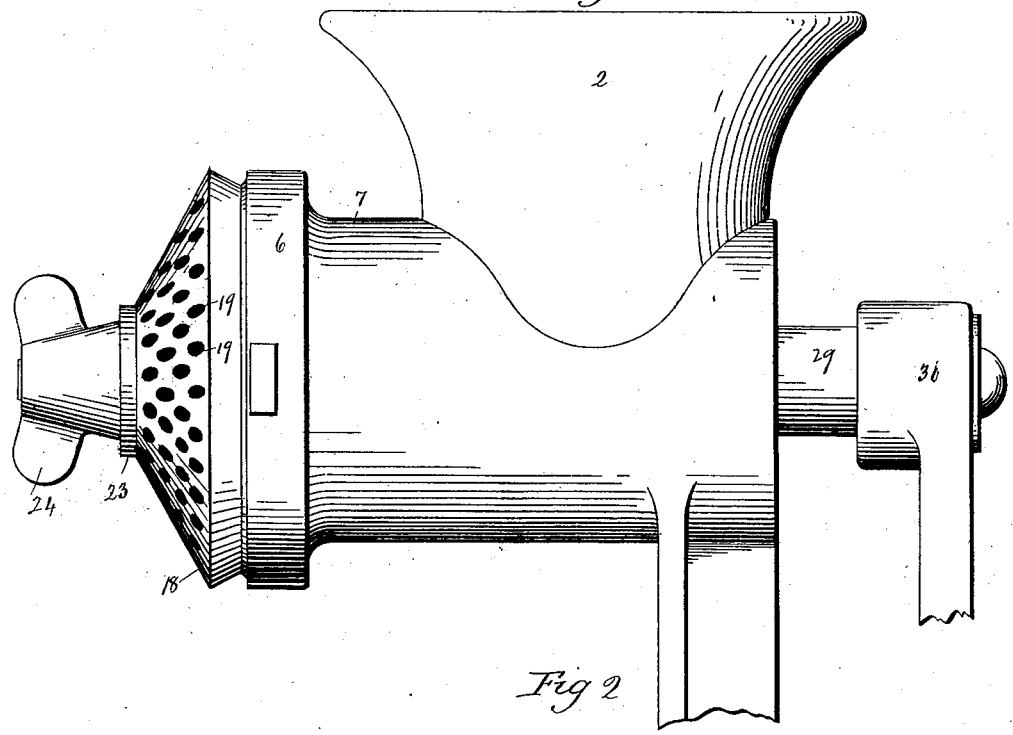
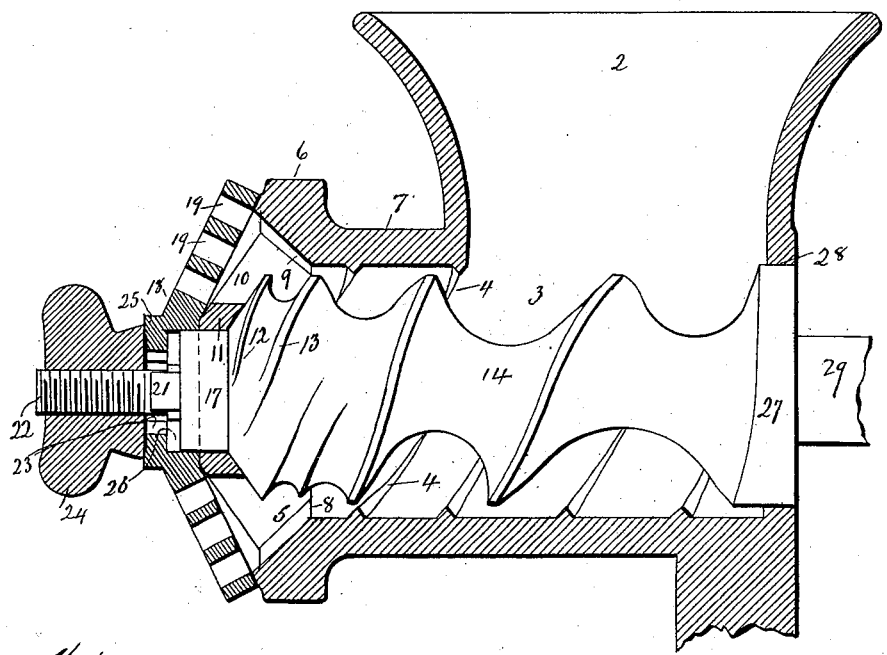

No. 754,249. PATENTED MAR. 8, 1904.
L. T. SNOW & A. A. WARNER.
FOOD CHOPPER.
APPLICATION FILED JUNE 30, 1902.
NO MODEL. 2 SHEETS—SHEET 2.
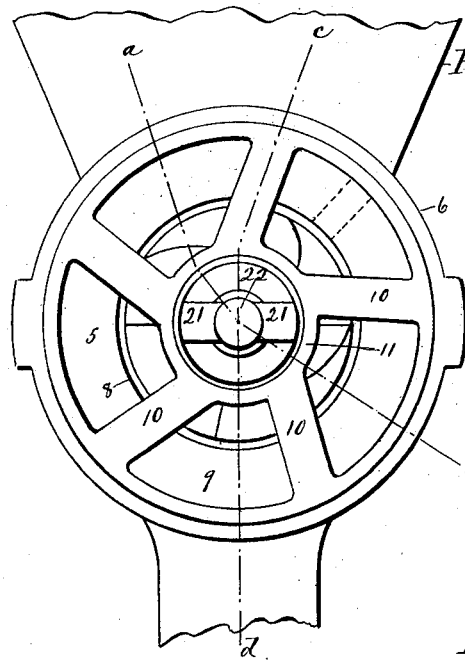
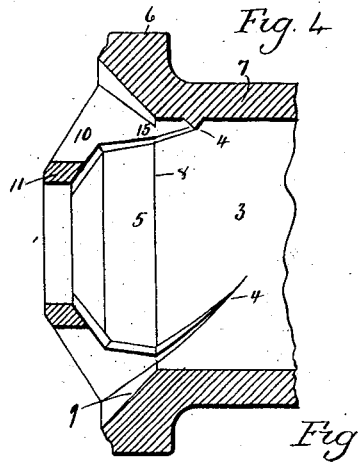
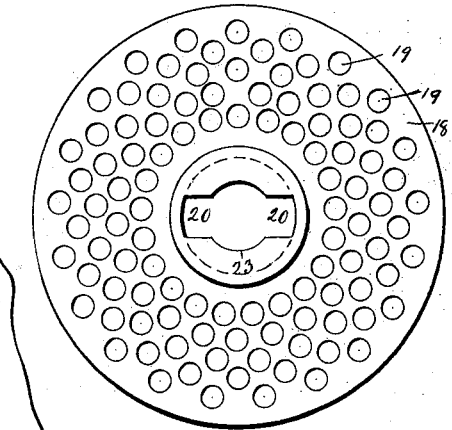
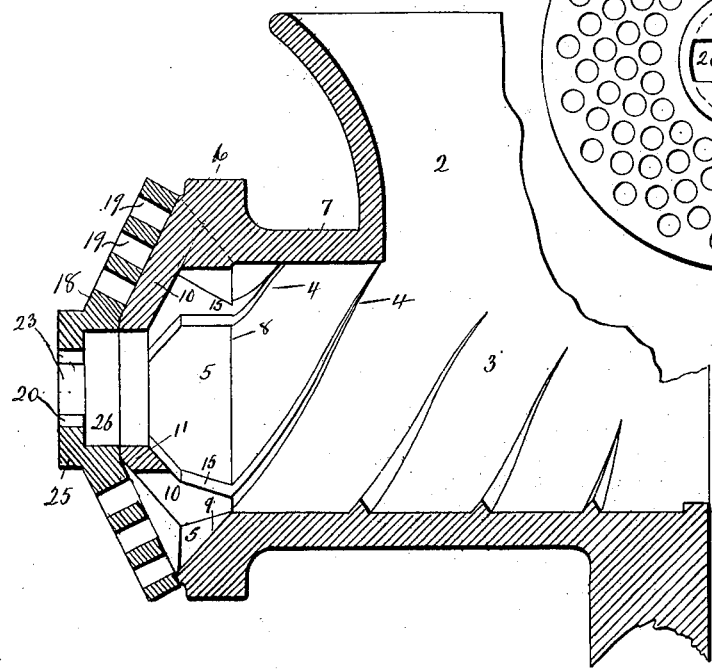

No. 754,249. Patented March 8, 1904.

UNITED STATES PATENT OFFICE.

LEVI T. SNOW, OF NEW HAVEN, AND ALONZO A. WARNER, OF NEW BRITAIN, CONNECTICUT; SAID WARNER ASSIGNOR TO SAID SNOW.

FOOD-CHOPPER.

SPECIFICATION forming part of Letters Patent No. 754,249, dated March 8, 1904.

Application filed June 30, 1902. Serial No. 113,874. (No model.)

*To all whom it may concern:*

Be it known that we, LEVI T. SNOW, of New Haven, county of New Haven, and ALONZO A. WARNER, of New Britain, county of Hartford, State of Connecticut, have invented a new and useful Improvement in Food-Choppers; and we do hereby declare the following, when taken in connection with the accompanying drawings and the numerals of reference marked thereon, to be a full, clear, and exact description of the same, and which said drawings constitute part of this specification, and represent, in—

Figure 1 a broken view, in side elevation, of one form which a food-chopper constructed in accordance with my invention may assume; Fig. 2, a broken view thereof in longitudinal section; Fig. 3, a broken view in elevation of the delivery end of the chopper with its cutter removed, as well as the thumb-nut by which the cutter and forcer are held in place; Fig. 4, a broken view of the delivery end of the case on the irregular line *a b* of Fig. 3; Fig. 5, a broken sectional view of the case on the line *c d* of Fig. 3, also showing the cutter in section; Fig. 6, a detached face view of the cutter.

Our invention relates to an improvement in food-choppers, the object being to produce a simple, compact, and efficient chopper constructed with particular reference to avoiding the pulping of the food, to ease of operation, and to enlarged capacity for work.

With these ends in view our invention consists in a food-chopper having certain details of construction and combinations of parts, as will be hereinafter described, and particularly recited in the claims.

In carrying out our invention, as herein shown, we employ a case having a hopper 2, a cylindrical forcing-chamber 3, containing screw-like forcing-ribs 4 of any approved form and arrangement, and a flaring or frustoconical chamber 5, into which the chamber 3 merges near the delivery end of the case, which serves as a secondary forcing-chamber and which on that account I shall hereinafter call the "secondary" forcing-chamber to distinguish it from the forcing-chamber 3, where the primary forcing of the food takes place. The said secondary forcing-chamber 5, which is larger in diameter than the chamber 3, is formed, as shown, in a heavy annular rib or flange 6, made integral with the delivery end of the barrel 7 of the case. By reference to Fig. 2 of the drawings it will be seen that the primary forcing-chamber 3 and the secondary forcing-chamber 5 are separated from each other by an obtuse annular shoulder 8, over which the food passes in its transit from one chamber to the other and which marks the point where the food expands, so to speak, into the secondary forcing-chamber, in which the food is forced forward by the forwardly-inclined rear wall 9 thereof at the same time that it is expanding outward therein. As herein shown, five tangentially-arranged forwardly-inclined cutting-arms 10 spring from the forward portion of the said forwardly-inclined rear wall 9 of the secondary forcing-chamber 5 and terminate at their inner ends in a bearing-ring 11. The rear faces of the said cutting-arms 10 are adapted to coact in cutting the food with the terminals 12 of the ribs 13 of the forcer 14, the forward end of which in the construction shown projects beyond the primary forcing-chamber 3 and through the full width of the secondary forcing-chamber 5. It may be explained in this connection that by constructing the cutting-arms 10 so as to spring from the forward portion of the rear wall 9 of the secondary forcing-chamber the rear portion of the said chamber is left unobstructed for the entrance thereinto of the delivery end of the cylindrical forcer, and hence of the forward ends of the forcing-ribs thereof; but as the said cylindrical forcer is smaller in diameter than the secondary chamber the ribs clear the wall of the said chamber with which wall, however, they coact to produce direct forward pressure supplemental to the pressure developed in the primary forcing-chamber. The extreme forward end of the forcer coacts with the inner faces of the said arms in cutting or, more accurately, "gashing" the food, whereby the cutter keeps itself clear and free to be rotated. The delivery end of the forcer extends, therefore, considerably beyond the annular shoulder 8, which separates the two chambers. Of course a portion of the pressure developed in the primary forcing-chamber 3 will be transmitted when the chopper is full by the food itself to the secondary forcing-chamber 5, where, however, additional pressure will be developed by that portion of the forcer located therein, as just above described.

In order to prevent the food from being carried around in the secondary forcing-chamber 5 by the rotary motion of that portion of the forcer 14 located in the said chamber, I provide triangular web-like stops 15, which, as shown, connect the inner portion of the wall 9 of the secondary forcing-chamber 5 with the rear faces of the inner ends of the cutting-arms 10 aforesaid. Stops of this form, however, might be replaced by stops in the form of lugs located upon the wall 9 and between the cutting-arms 10, as illustrated by broken lines in Fig. 3 at 16.

The bearing-ring 11 aforesaid receives a hub 17, formed at the forward end of the forcer 14. This hub projects beyond the said ring, so as to receive and support a conical cutter 18, formed with perforations 19, and having its inner face, which is a cutting-face, conformed in pitch to the pitch of the outer faces, which are also cutting-faces, of the cutting-arms 10. The forcing action of the secondary forcing-chamber 5 is maintained upon the food therein up to the time the same is presented to the cutting action of the cutter, for the reason that the outer end of the inclined wall 9 of the secondary forcing-chamber virtually terminates in the outer edge of the inner face of the conical cutter 18, as will be shown in Fig. 5. Here it may be noted that the conical form of the chamber 5 and the conical form of the cutter 18 give the device a very large capacity for work. The said conical cutter 18 is coupled with the forcer 14, so as to revolve therewith, and to that end is formed with two slots 20, receiving two coupling-lugs 21, located upon the outer end of the hub 17 of the forcer upon the opposite sides of a threaded stem 22, projecting therefrom, the said stem passing through the center of the cutter, which is slightly enlarged, as at 23, for the purpose, and receiving a thumb-nut 24, which bears against a shoulder 25, formed upon the outer face of the cutter, the inner face of which is recessed, as at 26, to adapt it to receive that portion of the hub 17 of the forcer which projects beyond the bearing-ring 11 aforesaid, whereby the cutter is centered and held in right position with respect to the arms 10, with which it coacts. The opposite or handle end of the forcer is formed with a closure or disk 27, fitting into a large assembling-opening 28, formed in the barrel 7 of the case and provided with a heavy stem 29, receiving a removable handle 30.

In view of the modifications suggested and of others which may obviously be made we do not limit ourselves to the exact construction shown and described, but hold ourselves at liberty to make such changes and alterations as fairly fall within the spirit and scope of our invention.

We are aware that in its general appearance and construction our improved food-chopper corresponds in many ways to that shown and described in United States Patent No. 591,575, granted October 12, 1897, to Levi T. Snow, one of the joint inventors herein named. We do not, therefore, claim as new the general construction of our chopper and the arrangement of its parts; nor do we claim the location of a clearance-bevel at the outer end of the case of a food-chopper, such as is designated by $A^4$ in Fig. 3 of the drawings of the patent referred to. In that patented construction the clearance-bevel is, so to speak, negative in its action in the sense that it prevents any constriction of the food at the point discharged, while, on the other hand, in our improved construction the secondary forcing-chamber is a factor of positive and functional quality and nearly doubles the food-chopping capacity of the device by increasing the cutting area and by utilizing the lateral pressure of the screw, which in the said chamber is transformed into direct forward pressure.

Having fully described our invention, what we claim as new, and desire to secure by Letters Patent, is—

1. In a food-chopper, the combination with a case having a cylindrical primary forcing-chamber and a conical secondary forcing-chamber larger in diameter than the same, of a cylindrical forcer corresponding in diameter to the primary forcing-chamber but smaller in diameter than the said secondary forcing-chamber, cutting-arms arranged to spring from the forward portion of the inclined wall of the secondary chamber so as to leave the rear portion of the said chamber unobstructed for the reception of the delivery end of the forcer the forward ends of the forcing-ribs of which enter the said unobstructed portion of the secondary chamber the inclined wall of which they clear, and a cutter carried by the forcer and coacting with the outer faces of the said arms to cut the food, whereby the food expands into the secondary chamber in which the ribs of the forcer coact through the food with the inclined wall thereof to produce direct forward pressure supplemental to the pressure developed in the primary forcing-chamber and whereby the food is forced between the said arms upon the outer faces of which it is cut by the cutter.

2. In a food-chopper, the combination with a case having a cylindrical primary forcing-chamber and a conical secondary forcing-chamber larger in diameter than the same, of a cylindrical forcer corresponding in diameter to the primary forcing-chamber but smaller in diameter than the said secondary forcing-chamber, cutting-arms arranged to spring from the forward portion of the inclined wall of the secondary chamber so as to leave the rear portion of the said chamber unobstructed for the reception of the delivery end of the forcer the forward ends of the forcing-ribs of which enter the said unobstructed portion of the secondary chamber the inclined wall of which they clear, a cutter carried by the forcer and coacting with the outer faces of the said arms to cut the food, and stops located within the rear portion of the secondary chamber and to the rear of the said arms for preventing the food from rotating therein with the forcer.

3. In a food-chopper, the combination with a case having a cylindrical primary forcing-chamber and a conical secondary forcing-chamber larger in diameter than the same, of a cylindrical forcer corresponding in diameter to the primary forcing-chamber but smaller in diameter than the said secondary forcing-chamber, cutting-arms arranged to spring from the forward portion of the inclined wall of the secondary chamber so as to leave the rear portion of the said chamber unobstructed for the reception of the delivery end of the forcer the forward ends of the forcing-ribs of which enter the said unobstructed portion of the secondary chamber the inclined wall of which they clear, a cutter carried by the forcer and coacting with the outer faces of the said arms to cut the food, and stops located at the bases of said arms for preventing the food from rotating therein with the forcer.

In testimony whereof we have signed this specification in the presence of two subscribing witnesses.

LEVI T. SNOW.
ALONZO A. WARNER.

Witnesses:
G. C. ATWELL,
CHARLES F. SMITH.